United States Patent [19]

Takeuchi et al.

[11] Patent Number: 4,866,616

[45] **Date of Patent: * Sep. 12, 1989**

[54] INFORMATION RECORDING APPARATUS FOR VEHICLES

[75] Inventors: Kunihiko Takeuchi, Kawasaki; Hajime Ikeda, Yokohama; Shinichi Horinouchi, Tokyo, all of Japan

[73] Assignee: Tokyo Keiki Company, Ltd., Tokyo, Japan

[ * ] Notice: The portion of the term of this patent subsequent to Aug. 15, 2006 has been disclaimed.

[21] Appl. No.: 168,255

[22] Filed: Mar. 15, 1988

[30] Foreign Application Priority Data

Mar. 20, 1987 [JP] Japan .............................. 62-671137

[51] Int. Cl.[4] ......................... G06F 3/08; G06F 15/74

[52] U.S. Cl. ................................ 364/424.04; 340/459

[58] Field of Search ...................... 364/424.01, 424.03, 364/424.04; 340/52 F

[56] References Cited

U.S. PATENT DOCUMENTS 4,067,061 1/1978 Juhasz .......................... 340/52 F X
4,258,421 3/1981 Juhasz et al. ................ 340/52 F X
4,307,455 12/1981 Juhasz et al. ........................ 364/900

*Primary Examiner*—David Mis
*Attorney, Agent, or Firm*—Wenderoth, Lind & Ponack

[57] ABSTRACT

Vehicle information such as vehicle speed, engine rotational speed when a vehicle runs are collected and converted into numerical data every constant period of time and these numerical data are written and recorded into a memory module. The memory module has therein a non-volatile memory and is detachably provided to a write unit attached to the vehicle. The data writing and power supply to the memory module from the write unit are executed by the contactless coupling using induction coils.

6 Claims, 11 Drawing Sheets

FIG.2

| ADDRESS | 8BIT DATA | CONTENT | TIME |
|---|---|---|---|
| A 0 | 26 | 2600 rpm | 12:57 |
| A 2 | 15 | 15 Km/h | |
| A 3 | 27 | 2700 rpm | 12:58 |
| A 4 | 52 | 52 Km/h | |
| A 5 | 15 | 1500 rpm | 12:59 |
| A 6 | 35 | 35 Km/h | |
| A 7 | ※ | TIME MARK | |
| A 8 | 19 | 1987 | |
| A 9 | 03 | MARCH 12 | |
| A10 | 12 | | |
| A11 | 13 | 13:00 | |
| A12 | 30 | 3000 rpm | 13:00 |
| A13 | 55 | 55 Km/h | |
| A14 | 33 | 3300 rpm | 13:01 |
| A15 | 60 | 60 Km/h | |

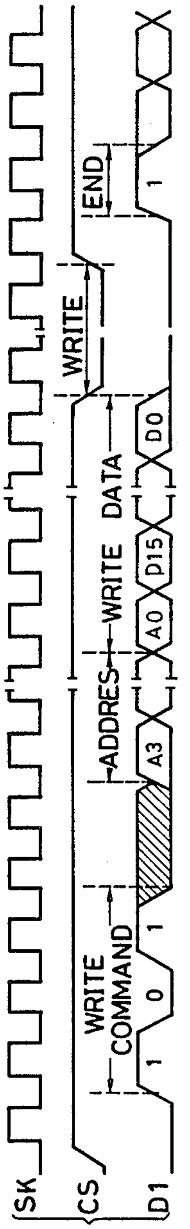
FIG. 6A WRITE
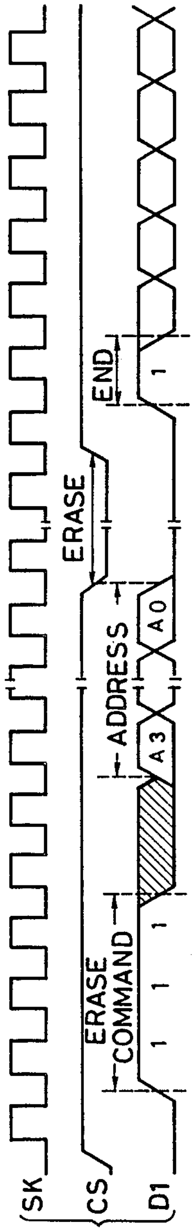
FIG. 6B ERASE

INFORMATION RECORDING APPARATUS FOR VEHICLES

BACKGROUND OF THE INVENTION

The present invention relates to an information recording apparatus for vehicles for recording various kinds of information regarding vehicles and, more particularly, to an information recording apparatus for vehicles in which information such as drive distance, drive time, vehicle speed, engine rotational speed, and the like are recorded into a detachable memory module by a contactless coupling.

Hitherto, in a tachograph of a vehicle, a disk-shaped recording paper is rotated at a constant speed by a motor reduced through a gear or the like, various vehicle data such as speed and the like are recorded along the circumferential direction (of a time base) by a pen recorder which oscillates in the radial direction, the recording paper is taken out as necessary, and drive management data is made.

However, in such a conventional tachograph, since it is constructed by mechanical parts, there is a limitation in the recording accuracy, so that the reliability lacks. Further, much labors are needed since a man reads the drive management data from the recording paper and converts them into the numerical values, to thereby make the drive management data.

To solve this problem, a system which can directly record the drive data by the numerical values is demanded. For example, there is considered a system for recording the drive data by using what is called an IC card or the like which is being put into practical use at present as a memory unit.

However, according to existing IC cards, electrical contacts are used to supply an operating power source and a recording signal to the memory unit. If such an IC card is used to record the drive data of a vehicle, there are many problems such that dusts and the like generated during the running enter the memory unit, so that the contacts are damaged and the defective contact easily occurs, on the other hand, water droplets are deposited to the contacts due to the temperature or moisture, so that the defective contact occurs due to the corrosion, and further, the defective contact occurs due to the vibration of the vehicle, and the like. Consequently, these problems are actually disadvantageous when such an IC card is used in the vehicle.

SUMMARY OF THE INVENTION

It is an object of the present invention to provide an information recording apparatus for vehicles for recording vehicle information into a memory module without using electrical contacts.

Another object of the invention is to provide an information recording apparatus for vehicles for recording vehicle information into a memory module by a contactless coupling.

Still another object of the invention is to provide an information recording apparatus for vehicles in which a power source and vehicle information are supplied to a memory module by an electromagnetic induction coupling by use of induction coils.

Still another object of the invention is to provide an information recording apparatus for vehicles for recording information such as engine rotational speed, vehicle speed, drive time, drive date (year, month, day), and the like into a memory module.

Still another object of the invention is to provide an information recording apparatus for vehicles in which an ID code of a driver is added to vehicle information and then the vehicle information is recorded into a memory module.

Still another object of the invention is to provide an information recording apparatus for vehicles for recording vehicle information into a memory module by a start-stop communication system.

Still another object of the invention is to provide an information recording apparatus for vehicles in which a power source signal, a transmission/reception sync clock, and an enable clock are multiplexed and supplied to a memory module, thereby recording vehicle information therein.

Namely, according to the invention, there is provided an information collecting processing unit to collect and process information detected by measuring instruments and the like attached to a vehicle, and the detected information such as engine rotational speed, vehicle speed, date (year, month, day), time, and the like are collected in a realtime manner and converted into the write data.

On the other hand, a detachable memory module having therein a non-volatile memory is provided for the vehicle.

Various kinds of vehicle information obtained by the information collecting processing unit are written into the non-volatile memory in the memory module by a write unit. The power supply and the writing operation of the vehicle information to the memory module by the write unit are executed by a contactless coupling apparatus using induction coils.

Detection signals of vehicle speed, engine speed, and the like when a vehicle runs are written and recorded as numerical data into the memory module, for example, on a one-minute unit basis. Therefore, by detaching the memory module from the vehicle and setting to a data processing apparatus, the drive record or the like can be easily made.

On the other hand, all of the transmission of the write data and power supply to the memory module are executed by the contactless coupling using the induction coils. Therefore, even if dusts or water droplets are deposited to the memory module or even if the memory module is subjected to the vibration during the running, the vehicle information can be certainly recorded. Thus, even under the very electrically severe use circumstances such as in the case where the information recording apparatus is attached to a vehicle, this apparatus fairly stably operates and the high reliability and durability are obtained.

The above and other objects, features, and advantages of the present invention will become more apparent from the following detailed description in conjunction with the accompanying drawings.

BRIEF DESCRIPTION OF THE DRAWINGS

FIG. 2 is an explanatory diagram showing an example of recording data which is recorded into a memory module in the embodiment of FIG. 1;

FIG. 6A is a timing chart for write control in the memory module in FIG. 5;

FIG. 6B is a timing chart for erase control in the memory module in FIG. 5;

DETAILED DESCRIPTION OF PREFERRED EMBODIMENTS

Figure 1:
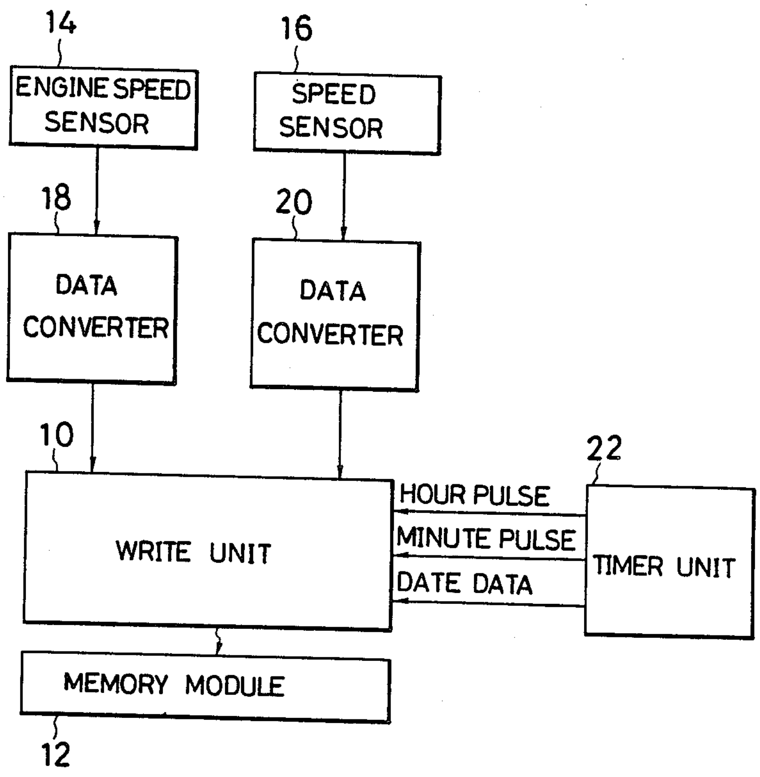
FIG. 1 is a block diagram showing an embodiment of the present invention.

FIG. 1 is a block diagram showing an embodiment of the present invention. This embodiment relates to an example in the case where a rotational speed of an engine and a speed of a vehicle are recorded as drive data.

In FIG. 1, reference numeral 14 denotes an engine speed sensor consisting of a proper sensor such as sensor to detect a contact output of a distributor of the engine, rotary encoder attached to the engine for generating the number of pulses proportional to the engine speed, or sensor to generate an analog voltage proportional to the engine speed. Reference numeral 16 denotes a vehicle speed sensor consisting of, for example, a sensor to generate an analog voltage in accordance with the rotation of a cable adapted to actuate a speed meter, a rotary encoder which is attached to a drive axis of a wheel and generates the number of pulses proportional to a rotational speed of wheel, or the like.

An output of the engine speed sensor 14 is input to a data converter 18. For example, when the engine speed sensor 14 outputs a pulse signal, the data converter 18 counts the number of pulses and converts into the engine speed data. On the other hand, when the engine speed sensor 14 outputs an analog signal, the data converter 18 converts the analog signal into the digital engine speed data. An output of the vehicle speed sensor 16 is also similarly input to a data converter 20. When the speed sensor 16 outputs a pulse signal, the data converter 20 counts the number of pulses and converts into the vehicle speed data. When the speed sensor 16 outputs an analog signal, the data converter 20 converts the analog signal into the digital vehicle speed data.

Reference numeral 22 indicates a timer unit in which date information (year, month, day) of a date calender is previously stored. The timer unit 22 generates an hour pulse every hour and a minute pulse every minute. Further, the timer unit 22 generates date data and time data.

Reference numeral 10 represents a write unit of recording data. The engine speed data from the data converter 18, the vehicle speed data from the data converter 20, and the time data from the timer unit 22 are input to the write unit 10. Drive data is made on the basis of these input data in accordance with a predetermined procedure and written into a memory module 12.

The memory module 12 has therein a non-volatile memory such as an EEPROM. A power source is supplied and the write data is transmitted from the write unit 10 to the memory module 12 by a contactless coupling method due to a magnetic induction coupling by using induction coils, as will be explained hereinlater.

The operation of the embodiment of FIG. 1 will now be described.

When an engine of a vehicle is started by an ignition key, a power source is also supplied to the vehicle information recording apparatus shown in the embodiment of FIG. 1, so that this apparatus is made operative. The engine rotational speed detected by the engine speed sensor 14 is converted into the digital data by the data converter 18. On the other hand, the vehicle speed detected by the speed sensor 16 is converted into the speed data by the data converter 20. These speed data are input to the write unit 10 in a realtime manner.

On the other hand, the timer unit 22 generates a minute pulse every minute. When the write unit 10 receives the minute pulses from the timer unit 22, the write unit reads the engine speed data and vehicle speed data obtained from the data converters 18 and 20 and writes into the memory module 12.

On the other hand, when the write unit 10 receives the hour pulses each of which is generated every hour from the timer unit 22, the write unit 10 writes the present hour generated from the timer unit 22 into the memory module 12.

By such a write control of the write unit 10, data as shown in, e.g., FIG. 2 is written into the memory module 12.

FIG. 2 shows an example of vehicle data recorded in the memory module 12. In the vehicle data, one byte is constituted by eight bits. For example, the engine speed of 2600 r.p.m. obtained at the time of 12:57 is recorded into addresses $A_0$ to $A_6$ and, simultaneously, the vehicle speed of 15 km/h derived at the same time is also written. The engine speed and vehicle speed are written every minute.

Data in address $A_7$ indicates time mark. When the time pulse is input from the timer unit 22, the time mark is recorded. The data of year, month, day, hour, and minute are recorded in subsequent addresses $A_8$ to $A_{11}$. Thereafter, the engine speed and vehicle speed are again recorded every minute.

When the vehicle data shown in FIG. 2 is recorded, 120 bytes are necessary to record the engine speed data and vehicle speed data per hour, and six bytes are necessary to record the date such as year, month, and day. Namely, total 126 bytes are needed. Therefore, if the non-volatile memory whose memory capacity is, e.g., 8 kbytes is included in the memory module 12 and used, the vehicle data of the amount corresponding to about 64 hours can be recorded. Similarly, in the case of using the non-volatile memory having the capacity of 256 kbytes, the vehicle data of the amount corresponding to ten days or more can be recorded.

Figure 3:
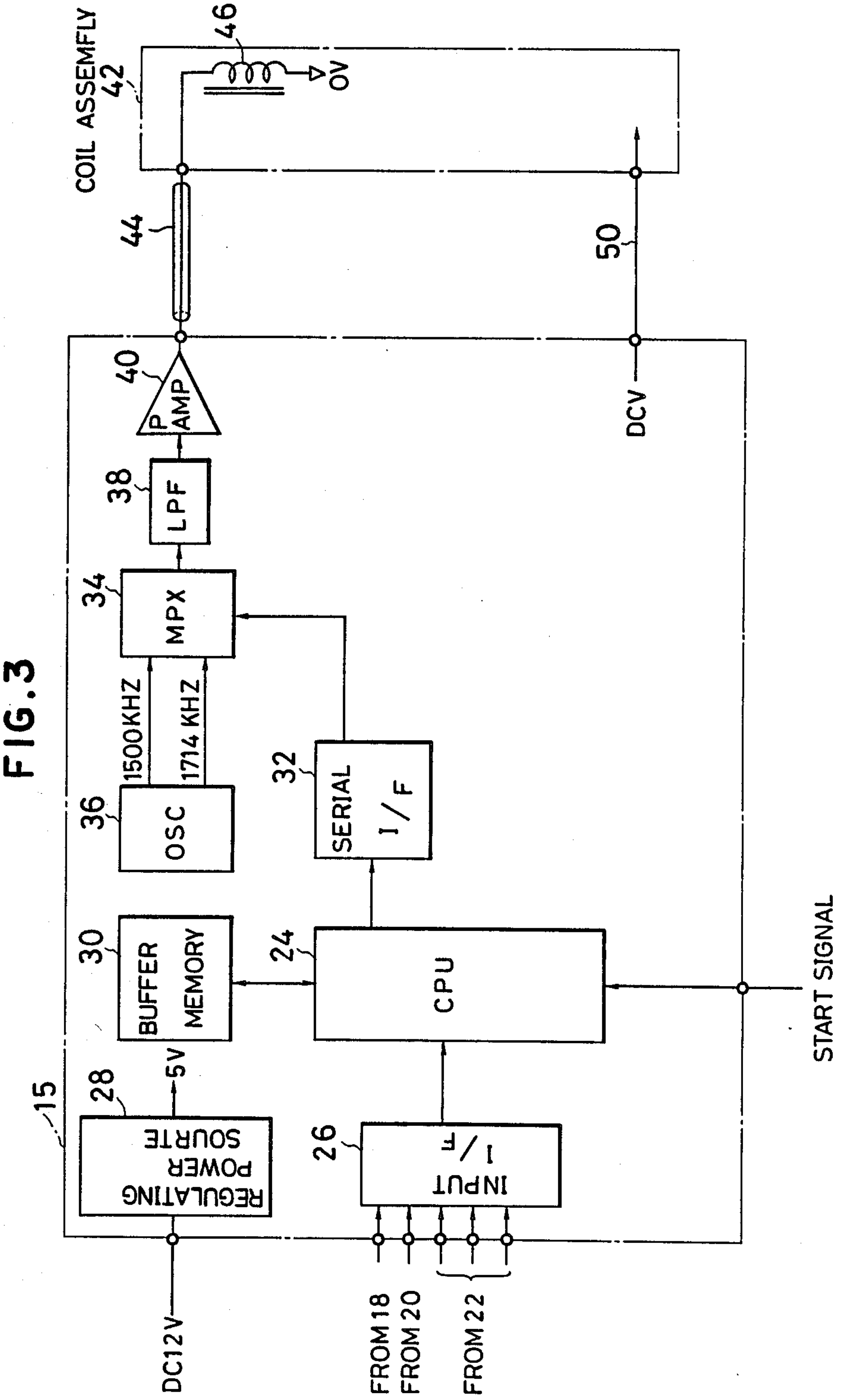
FIG. 3 is a block diagram showing an embodiment of a recording data write unit in the embodiment of FIG. 1.

FIG. 3 is a block diagram showing an embodiment of the write unit 10 in the embodiment of FIG. 1.

In FIG. 3, the write unit 10 comprises an apparatus main unit 15 and a coil assembly 42. The coil assembly 42 and the apparatus main unit 15 are connected by a coaxial cable 44 and a power source cable 50. The coil assembly 42 and apparatus main unit 15 can be also obviously integrated as a single unit.

In the apparatus main unit 15, a CPU (central processing unit) 24 performs the write control of the engine speed data, vehicle speed data, and time data obtained through an interface 26. A buffer memory 30 to temporarily store the input data from the interface 26 is connected to the CPU 24. When the data is written into the memory module 12 as will be explained hereinlater, the data is once stored into the buffer memory 30 and thereafter, the data is read out and transferred.

An output port of the CPU 24 to the memory module is connected to a serial interface 32. The parallel data from the CPU 24 is converted into the serial data by the serial interface 32.

The write data sent from the CPU 24 through the serial interface 32 is used as a switching signal of a multiplexer 34. Clock frequency signals of 1500 kHz and 1714 kHz are generated from an oscillator 36 and supplied to the multiplexer 34. When the multiplexer 34 receives the data bit "1" from the serial interface 32, the multiplexer 34 selects the clock frequency signal of 1714 kHz from the oscillator 36 and outputs. On the other hand, when the multiplexer 34 receives the data bit "0" from the serial interface 32, the multiplexer 34 selects the clock frequency signal of 1500 kHz and outputs. Consequently, the multiplexer 34 and oscillator 36 constitute frequency modulating means for converting the serial data into two different frequency signals corresponding to the data bits "1" and "0".

The frequency signal of 1714 kHz or 1500 kHz selected by the multiplexer 34 is given to a low pass filter 38 and converted into a sine wave signal. The frequency signal converted into the sine wave by the low pass filter 38 is amplified by a power amplifier 40 and supplied through the coaxial cable 44 to an induction coil 46 provided in the coil assembly 42.

Further, a start signal to start the recording control at the start of the engine by turning on the ignition switch is also input to the CPU 24.

Figure 4:
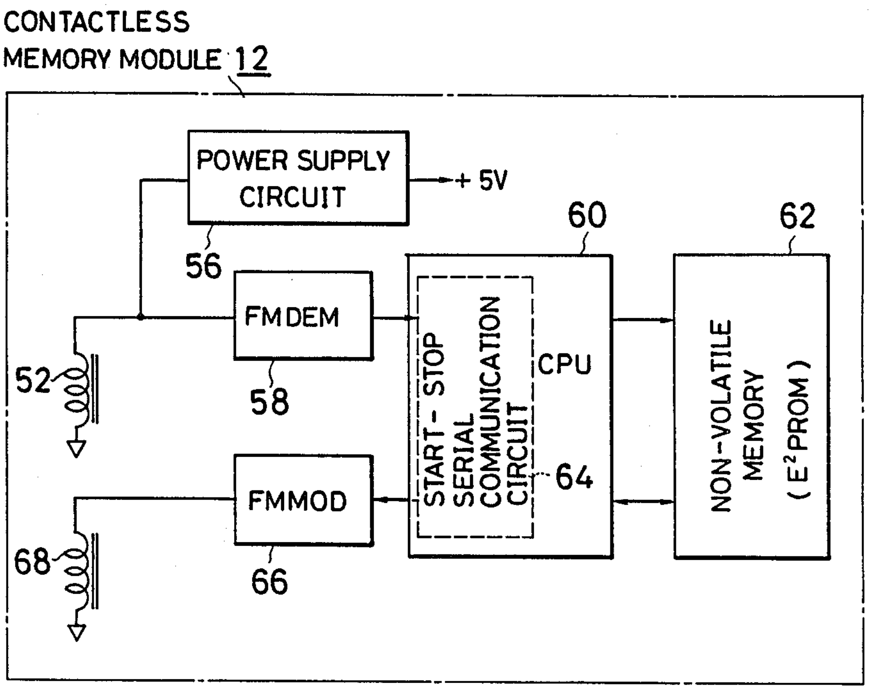
FIG. 4 is a block diagram showing an embodiment of a memory module in the embodiment of FIG. 1.

FIG. 4 is a block diagram showing an embodiment of the memory module in the embodiment of FIG. 1.

In FIG. 4, reference numeral 52 denotes an induction coil to receive the power source and signal. The induction coil 52 is located so as to face the induction coil 46 in the coil assembly 42 on the side of the recording data write unit 10 in FIG. 3. A frequency modulation signal consisting of a combination of 1500 kHz and 1714 kHz is induced by the electromagnetic induction coupling. An output of the induction coupling coil 52 is supplied to a power supply circuit 56. By rectifying the frequency signal consisting of a combination of 1500 kHz and 1714 kHz, a power source voltage of +5 V which is used in the internal circuits of the memory module 12 is formed. On the other hand, the output of the induction coupling coil 52 is also supplied to a frequency demodulator 58, by which two frequency signals are converted into the data bits of "1" and "0". Practically speaking, the frequency demodulator 58 to convert the two frequency signals into the data bits may be constituted by a band pass filter whose center frequency is 1714 kHz and whose pass band width is set to ±50 kHz and a detection circuit using a pin diode and the like for detecting an output of the band pass filter. When the frequency demodulator 58 receives the frequency signal of 1714 kHz, it outputs the data bit "1". On the other hand, when the demodulator 58 receives the frequency signal of 1500 kHz, it outputs the data bit "0".

The data signal demodulated by the frequency demodulator 58 is supplied to a CPU 60. The CPU 60 has a start-stop serial communication circuit 64 as shown by a broken line. The CPU 60 transmits the serial data while obtaining the signal synchronization with the write unit shown in FIG. 3 by a start-stop method. A one-chip type CPU is used as the CPU 60. An ROM and an RAM are assembled in the same chip.

A non-volatile memory 62 to store the data is connected to the CPU 60. As the non-volatile memory 62, for example, an EEPROM (electrically erasable programmable ROM) in which data can be electrically rewritten by an external signal is used. To further reduce an electric power consumption, a CMOS type EEPROM is preferably used. The non-volatile memory 62 can write or read data into or from an address which is designated by the CPU 60.

The data read out of the memory 62 by the CPU 60 is converted into the serial data under control of a start-stop serial communication circuit 64 and given to a frequency modulator 66. When the frequency modulator 66 receives the data bit "1" from the CPU 60, the modulator 66 outputs a frequency signal of 1865 kHz. When the modulator 66 receives the data bit "0", it stops the generation of the frequency signal. Practically speaking, the frequency modulator 66 comprises an oscillator having an oscillating frequency of 1865 kHz and an AND gate to get the AND of an oscillation output of the oscillator and the data bit from the CPU 60. Thus, for the readout data, the data bit "1" is set to the frequency signal of 1865 kHz and the data bit "0" is set to the signal of the frequency 0.

An output of the frequency modulator 66 is supplied to an induction coil 68. The induction coil 68 is used when the contactless memory module 12 is detached from the vehicle and set to the data processing apparatus in order to make the drive management data. By providing a data receiving circuit similar to the induction coil 52 and frequency demodulator 58 for the data processing apparatus side, the recording data can be transmitted by the contactless coupling method.

The coil assembly 42 shown in FIG. 3 is enclosed in a casing made of a ferromagnetic material of the iron system or a non-magnetic material such as aluminum or plastics. The coil assembly 42 is positioned such that the core magnetic pole surface of the induction coil is exposed in front of the casing. By allowing a signal current to flow through the coil, the magnetic field can be generated from the core magnetic pole surface to the outside. In the case of the casing made of a non-magnetic material, there is no need to expose the core magnetic pole surface. On the other hand, the memory module 12 in FIG. 4 has a detachable cassette structure such that not only the induction coils 52 and 68 but also the circuit section including the CPU 60 and non-volatile memory 62 are all enclosed in the casing made of a ferromagnetic or non-magnetic material.

The operation to write data into the memory module 12 in FIG. 4 by the write unit 10 in FIG. 3 will now be described.

When the minute pulses are input from the timer unit 22 to the CPU 24, the engine speed data and vehicle speed data at that time are read and the writing operation to the memory module 12 is started by the CPU 24.

Namely, the write data from the CPU 24 is converted into the serial data by the serial interface 32 and supplied as a switching signal to the multiplexer 34. When the data bit is set to "1", the multiplexer 34 selects the clock frequency signal of 1714 kHz from the oscillator 36 and outputs. When the data bit is set to "0", the multiplexer 34 selects the clock frequency signal of 1500 kHz from the oscillator 36 and outputs. Thus, the write data is converted into the frequency signal consisting of a combination of two different frequencies of 1714 kHz and 1500 kHz. The frequency signal from the multiplexer 34 is converted into the sine wave signal by the low pass filter 38 and amplified by the power amplifier 40. Thereafter, the amplified signal is supplied to the induction coil 46 of the coil assembly 42, from which the external magnetic field corresponding to the frequency signal is generated. The induction coil 52 in the memory module 12 in FIG. 4 is arranged so as to face the induction coil 46 through a predetermined gap. Therefore, a signal corresponding to the external magnetic field by the induction coil 46 is induced in the induction coupling coil 52 in the memory module 12. The frequency signal in the induction coupling coil 52 is rectified by the power supply circuit 56 and supplied as a power source voltage of +5 V to each circuit section in the contactless memory module 12. Thus, the internal circuits in the memory module 12 are made operative. At the same time, the frequency signal from the induction coupling coil 52 is converted into the data bit "1" or "0" by the frequency demodulator 58 and supplied to the CPU 60. The data is written into a predetermined address in the non-volatile memory 62.

When the write data is transmitted from the write unit 10, for example, the serial data is transferred on a 32-byte unit basis. When the data of 32 bytes is received by the memory module 12, the presence or absence of data errors is checked. If the data is correct, the reception data is written into the memory 62. However, if any error is detected in the data, the data writing operation is stopped.

Further, if any error is detected in the data, a request for retransmission of data may be also sent to the side of the write unit 10. In this case, it is sufficient to provide an induction coupling coil for reception and a frequency demodulator for the embodiment of FIG. 3 and to send the request for retransmission to the CPU 24 from the memory module side.

When the correct data cannot be received even after the request for retransmission was performed a predetermined number of times, an alarm is indicated for making a driver/operator check.

Figure 5A:
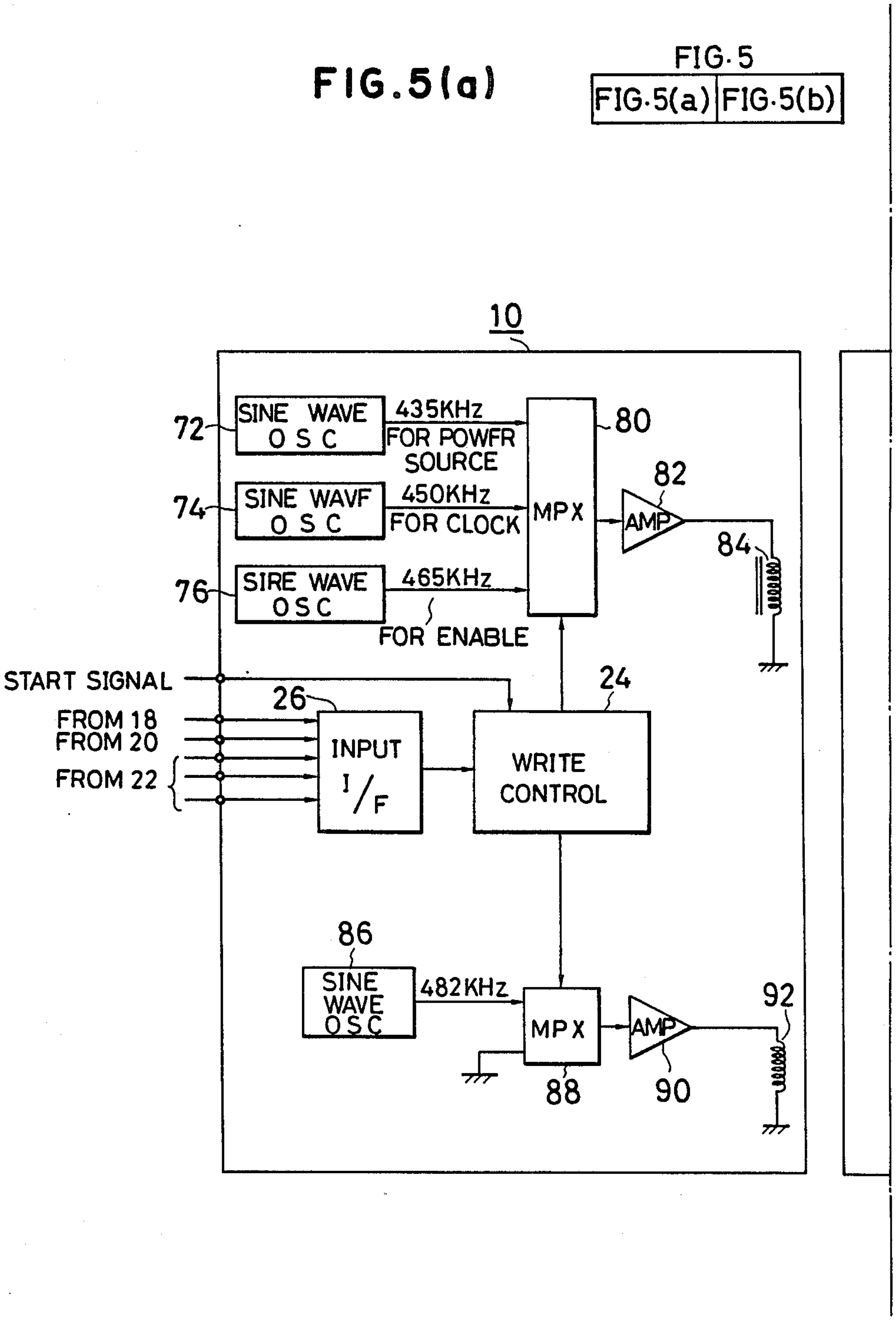
FIG. 5 consisting of FIGS. 5(*a*) and 5(*b*) is a circuit block diagram showing another embodiment of the write unit and memory module in the embodiment of FIG. 1.
Figure 5B:
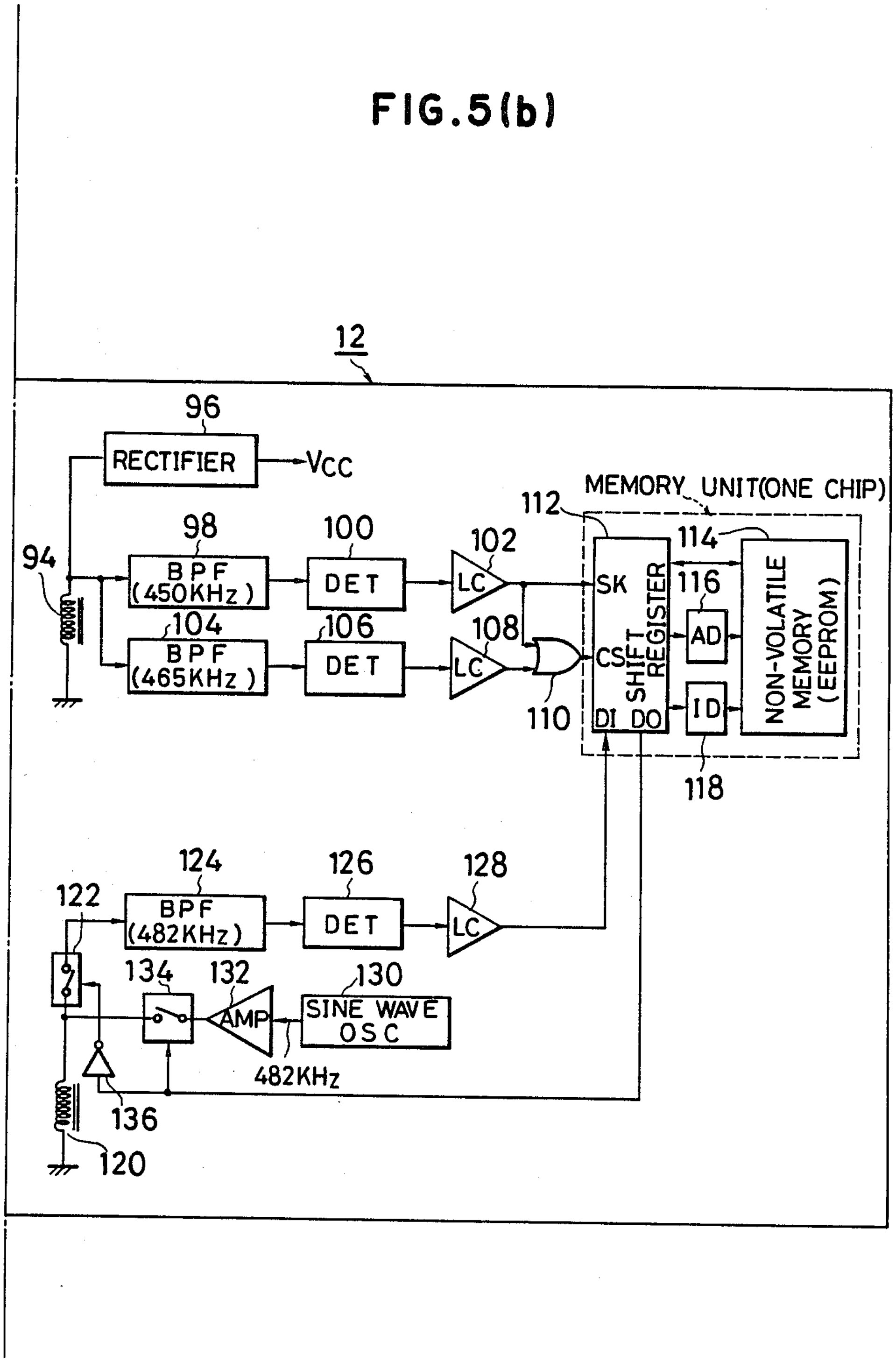

FIG. 5 is a block diagram showing another embodiment of the write unit 10 and memory module 12 in the embodiment of FIG. 1.

In FIG. 5, the write unit 10 has an induction coil 84 to transmit an operating electric power and a write control signal to the memory module 12; and an induction coil 92 to transmit the write data (write command, address, data) to the contactless memory module 12. An induction coil 94 provided for the memory module 12 is positioned so as to face the induction coil 84 for the power source and write control signal through a predetermined gap. On the other hand, an induction coil 120 is provided in the memory module 12 so as to face the induction coil 92 in the write unit 10 through a predetermined gap. The write data (write command, address, and data) can be transmitted by the contactless induction coupling by using the induction coils 92 and 120.

The memory module 12 has therein a non-volatile memory 114 consisting of an EEPROM. The memory 114 uses a memory unit having a shift register 112 in the same chip. The shift register 112 converts the write data which is serially transmitted from the outside into the parallel data and converts the parallel data read out of the memory 114 into the serial data and then transmits. As a memory unit having the shift register for performing the serial-parallel conversion in the same chip, for example, it is possible to use an EEPROM having the communicating function such as NMC9306 made by National Semiconductor Co., Ltd. or X2404 made by Xicor Co., Ltd.

For example, in the case of using the NMC9306 made by National Semiconductor Co., Ltd. as the memory unit having the non-volatile memory 114 therein, as shown in FIG. 5, the shift register 112 has a shift clock terminal SK, a chip selection terminal (enable terminal) CS, a serial data input terminal DI, and a serial data output terminal DO. By supplying a shift clock to the shift clock terminal SK in the enable state in which the chip selection terminal CS is set to the H level, the shift register 112 reads the serial data given to the serial data input terminal DI synchronously with the shift clock and converts into the parallel data and can control the writing operation of the recording data into the non-volatile memory 114. On the other hand, an instruction decoder 116 to decode a recording data write command and an address decoder 118 to designate a write or read address are provided between the shift register 112 and the non-volatile memory 114.

FIGS. 6A and 6B are time charts showing the write control and erase control to the memory 114 by the shift register 112 provided in the memory module 12 in FIG. 5.

In the write control shown in FIG. 6A, the enable state is formed by setting the chip selection terminal SC to the H level by supplying a shift clock to the shift clock terminal SK. When the write command "010", write addresses "$A_3$ to $A_0$", and write data "$D_{15}$ to $D_0$" are input to the serial data input terminal DI in this enable state, they are sequentially converted into the parallel data synchronously with the shift clocks in accordance with this order. The write command is decoded by the instruction decoder 118 and the memory 114 is set into the writing mode. The write addresses which are subsequently obtained are decoded by the address decoder 116 and the write addresses are designated. The parallel conversion output of the write data which is finally obtained is written into the designated address.

Next, in the erase control shown in FIG. 6B, the enable state is formed by setting the chip selection terminal CS to the H level by supplying a shift clock to the shift clock terminal SK. In this enable state, the erase command "111" input to the serial data input terminal DI is converted into the parallel data synchronously with the shift clock. The erase command is decoded by the instruction decoder 118. The memory content in the designated address is erased in response to the erase command.

In the write control, when the serial-parallel conversion of the write data is finished, the chip selection terminal CS is set to the L level and for this period of time, the converted parallel data is written into the memory 114 from the shift register 112.

Further, in the erase control as well, after completion of the parallel conversion of the address data "$A_3$ to $A_0$", the chip selection terminal CS is set to the L level and the memory content in the designated address is erased during this interval. Further, in the write control and erase control, the chip selection terminal SC is set to the L level. After completion of the writing or erasing operation of the data, the chip selection terminal CS is reset to the H level. When an end command obtained at the serial data input terminal DI is finally received, the single write or erase control is finished.

Further in the read control, it is sufficient to designate the read command "110" and read addresses "$A_3$ to $A_0$".

In the case of the write unit 10 for the memory module 12 which performs the writing operation (also can perform the erase control) by the shift clock and chip select signal shown in FIG. 6A, it is necessary to supply the shift clocks and chip select signal (enable signal) to the shift register 112 in the memory unit of the memory module 12. Further, it is also necessary to supply the operating electric power to the shift register 112.

Therefore, the write unit 10 in FIG. 5 has: a sine wave oscillator 72 to oscillate a sine wave signal of 435 kHz to supply an operating electric power; a sine wave oscillator 74 to oscillate a sine wave signal of 450 kHz for shift clocks; and a sine wave oscillator 76 to oscillate a sine wave signal of 465 kHz for enabling. Outputs of the sine wave oscillators 72, 74, and 76 are input to a multiplexer 80. The multiplexer 80 selects either one of the sine wave signals in response to a control signal from the CPU 24 and supplies to the induction coil 84 through an amplifier 82.

The CPU 24 starts operating in response to a start signal when the engine is started by turning on the ignition switch. Each time a minute pulse is input from the timer unit 22 through the input interface 26, the CPU 24 allows the vehicle speed data and engine speed data to be written.

Namely, the CPU 24 converts the write data to write the input data into the serial data synchronously with the internal clock and outputs. When the write control is started, the CPU 24 selects the frequency signal of 450 kHz for clocks and supplies to the induction coil 84 through the amplifier 82 when the sync clock to serially transmit the write data is set to "1". On the other hand, when the sync clock is set to "0", the CPU 24 selects the frequency signal of 465 kHz for enabling and supplies to the induction coil 84. In this manner, the CPU 24 alternately repeats the switching operation.

Namely, the bit "1" of the sync clock for transmission which is supplied from the CPU 24 is modulated by the frequency signal of 450 kHz by the multiplexer 80. On the other hand, the bit "0" of the sync clock is modulated by the frequency signal of 465 kHz by the multiplexer 80. Further, when no sync clock is obtained, the multiplexer 80 supplies the frequency signal of 435 kHz for a power source to the induction coil 84. In correspondence to the frequency signal which was time sharingly multiplexed after it had been modulated by the frequency signals for power source, clock, and enabling which are supplied to the induction coil 84 of the write unit 10, means for demodulating the chip select signals for operating power source, shift clocks, and enabling from the frequency modulation signal induced in the induction coil 94 by the induction coupling is provided on the side of the memory module 12.

First, an output of the induction coil 94 is given to a rectifier 96. The rectifier 96 rectifies all of the frequency modulation signals induced in the induction coil 94 and supplies a power source voltage of $+V_{cc}$ to each circuit section in the memory module 12.

The output of the induction coil 94 is also given to a band pass filter 98 to take out the frequency modulation signal of 450 kHz for clocks. The band pass filter 98 has a center frequency of 450 kHz and a pass band width of $\pm 2$ to 2.5 kHz for this center frequency. Thus, only the frequency modulation signal of 450 kHz for clocks can be taken out from three frequency signals of 435, 450, and 465 kHz. An output of the band pass filter 98 is given to a detection circuit 100. The detection circuit 100 demodulates shift clocks from the frequency modulation signal of 450 kHz. This signal is further waveform shaped to the square wave signal by a waveform shaping circuit 102. The demodulated shift clocks are supplied to the shift clock terminal SK of the shift register 112 in the memory unit.

On the other hand, the output of the induction coil 94 is input to a band pass filter 104 to take out the frequency modulation signal 465 kHz to enable. The band pass filter 104 has a center frequency of 465 kHz and a pass band width of $\pm 2$ to 2.5 kHz for this center frequency. Therefore, only the frequency modulation signal of 465 kHz to enable can be taken out from the three frequency modulation signals of 435, 450, and 465 kHz induced in the induction coil 94. An output of the band pass filter 104 is given to a detection circuit 106. The detection circuit 106 demodulates the clock signal to enable (inverted signal of the shift clock) from the frequency modulation signal of 465 kHz. This signal is waveform shaped by a waveform shaping circuit 108. Thereafter, the waveform shaped signal is input to one input terminal of an OR gate 110. The shift clock is supplied from the waveform shaping circuit 102 to the other input terminal of the OR gate 110. By getting the OR of the shift clock and enable clock by the OR gate 110, an enable signal to the chip selection terminal CS of the shift register 112 is generated.

Figures 7A, 7B, 7C:
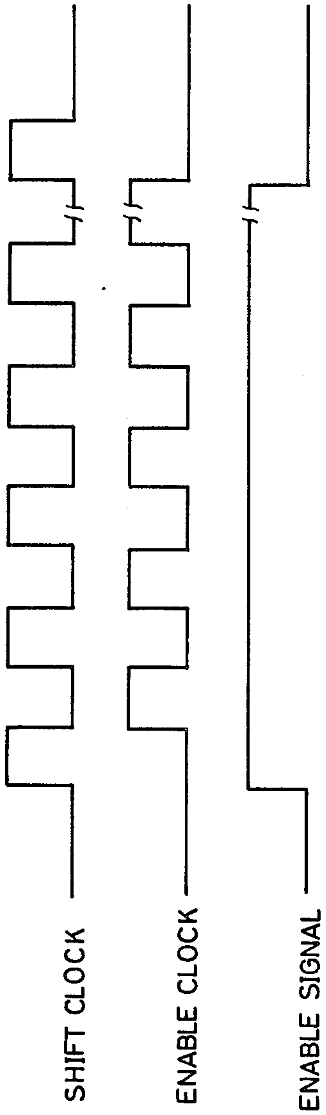
FIG. 7A is a timing chart for a sync clock which is received by the memory module in FIG. 5.
FIG. 7B is a timing chart for an enable clock which is received by the memory module in FIG. 5.
FIG. 7C is a timing chart for an enable signal which is generated from the memory module in FIG. 5.

Namely, since both of the shift clock shown in FIG. 7A and the enable clock shown in FIG. 7B are input to the OR gate 110, by getting the OR of them, the enable signal which is supplied to the chip selection terminal CS can be formed as shown in FIG. 7C.

Therefore, with respect to the write state to the memory module 12 (the same shall also apply to the erase and read states), when the sync clock obtained from the CPU 24 is set to the bit "1", the multiplexer 80 provided in the write unit 10 selects the frequency signal of 450 kHz for clocks. When the sync clock is set to the bit "0", the multiplexer 80 selects the frequency signal of 465 kHz to enable. Consequently, when the enable clock is obtained the OR gate 110 in the memory module 12 can form the enable state to write (or read) by setting the chip selection terminal CS to the H level.

Next, the system to transmit write data between the CPU 24 in the write unit 10 and the memory module 12 will now be described.

First, the write unit 10 has a multiplexer 88 for serially converting the write information (write command, write address, write data) or erase information (erase command, erase address) by the internal clocks and for converting the bit data generated from the CPU 24 into the frequency signal. A sine wave oscillator 86 to oscillate the frequency signal of 482 kHz indicative of the data bit "1" is connected to one input terminal of the multiplexer 88. The other input terminal of the multiplexer 88 is grounded to give the signal of frequency 0 indicative of the data bit "0". Therefore, when the data bit "1" is received from the CPU 24, the multiplexer 88 outputs the frequency signal of 482 kHz. When the data bit "0" is received, the multiplexer 88 outputs the signal of frequency 0. Namely, the multiplexer 88 represents the data bit "1" or "0" in dependence on the presence or absence of the frequency signal of 482 kHz.

An output of the multiplexer 88 is connected to the induction coil 92 through an amplifier 90. The frequency modulation signal of the data bit supplied to the induction coil 92 induces the frequency modulation signal in the induction coil 120 of the memory module 12 which is separately positioned with a predetermined gap. The frequency modulation signal induced in the induction coil 120 is input to a band pass filter 124 through an analog switch 122. The band pass filter 124 has a center frequency of 482 kHz and a pass band width of ±2 to 2.5 kHz for this center frequency. Therefore, only the frequency modulation signal of 482 kHz induced in the induction coil 120 can be taken out. An output of the band pass filter 124 is supplied to a detection circuit 126. The detection circuit 126 demodulates the data bit from the frequency modulation signal of 482 kHz. The demodulated signal is further waveform shaped to the square wave signal by a waveform shaping circuit 128. Thereafter, the demodulated bit data is input to the serial data input terminal DI of the shift register 112 in the memory unit.

On the other hand, when the memory module 12 is detached from a vehicle and set to a processing apparatus of the drive management data, in order to transfer the readout data which is output as the serial data from the data output terminal DO of the shift register 112, a sine wave oscillator 130 to oscillate a sine wave signal of 482 kHz which is used to frequency modulate the bit data is provided. An output of the sine wave oscillator 130 is connected to the induction coil 120 through an amplifier 132 and an analog switch 134. The analog switch 134 is turned on or off in accordance with the bit data obtained from the serial data output terminal DO of the shift register 112. Namely, when the data bit is set to "1", the analog switch 134 is turned on to supply the sine wave signal of 482 kHz to the induction coil 120. When the data bit is set to "0", the analog switch 134 is turned off to stop the supply of the sine wave signal of 482 kHz to the induction coil 120. On the basis of the on-off control responsive to the serial data bit of the analog switch 134, the serial bit data obtained from the serial data output terminal DO of the shift register 112 is converted into the frequency signal of 482 kHz in response to the bit "1" and is converted into the signal of frequency in response to the bit "0".

The analog switch 122 to connect the output of the induction coil 120 to the band pass filter 124 is turned on or off by the signal obtained by inverting the output of the serial data output terminal DO of the shift register 112 by an inverter 136. Namely, when the serial bit data of the readout data is not output from the serial data output terminal DO, an output of the inverter 136 is set to the H level, so that the analog switch 122 is turned on. When the serial data output terminal DO is set to the bit "1" due to the readout data, the output of the inverter 136 is set to the L level, thereby turning off the analog switch 122.

Figure 8:
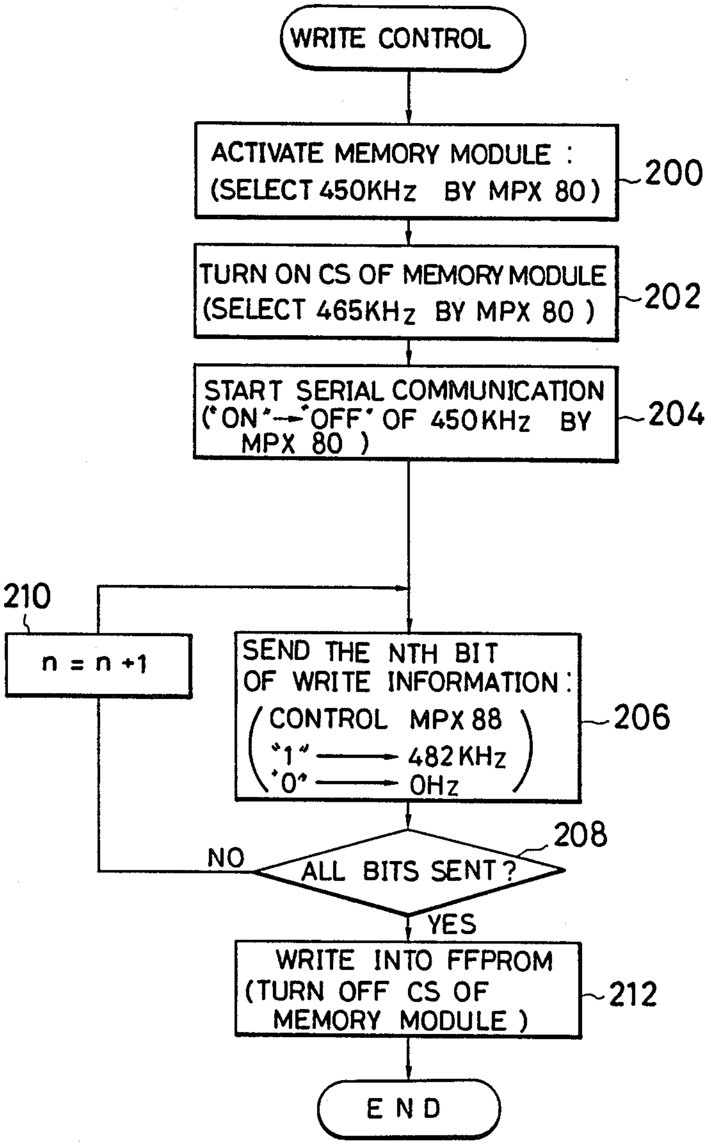
FIG. 8 is a flowchart showing the write control according to the embodiment of FIG. 5.

The write control to the memory module 12 in the embodiment of FIG. 5 will now be described with reference to a flowchart of FIG. 8.

First, prior to executing the write control, the contactless memory module 12 is activated in block 200. Namely, in the write unit 10, the multiplexer 80 selects the frequency signal of 435 kHz for power source in response to a control signal from the CPU 24. This signal is amplified by the amplifier 82 and supplied to the induction coil 84.

The frequency modulation signal of 435 kHz by the induction coil 84 is induced in the induction coil 94 of the memory module 12 and rectified by the rectifier 96. Thus, the power source voltage $+V_{cc}$ to make each circuit section in the memory module 12 operative is obtained.

Subsequently, as shown in block 202, the enable state is set by turning on the chip selection terminal CS of the shift register 112 in the memory module 12. The turn-on of the chip selection terminal CS is performed by selecting the frequency signal of 465 kHz to enable by the multiplexer 80. The frequency signal of 465 kHz induced in the induction coil 94 is demodulated by the band pass filter 104, detection circuit 106, and waveform shaping circuit 108. By setting the chip selection terminal CS of the shift register 112 to the H level through the OR gate 110, the enable state is formed.

Subsequently, as shown in block 204, the serial communication of the write information consisting of the write command, write address, and write data by the CPU 24 is started.

To start the serial communication, the multiplexer 80 repetitively outputs the frequency signal of 450 kHz for clocks synchronously with the clocks which are given from the CPU 24. Thus, the multiplexer 80 selects the frequency signal of 450 kHz for clocks when the sync clock is set to the bit "1". The multiplexer 80 selects the frequency signal of 465 kHz to enable when the sync clock is set to the bit "0". Therefore, in the memory module 12, the clock signal based on the frequency signal of 450 kHz is reproduced by the band pass filter 98, detection circuit 100, and waveform shaping circuit 102 and supplied to the shift clock terminal SK of the shift register 112. At the same time, by getting the OR of the shift clock and enable clock by the OR gate 110, the chip selection terminal CS of the shift register 112 is held at the H level, thereby forming the enable state of the memory unit.

Subsequently, as shown in block 206, the CPU 24 converts the write information, namely, the parallel data consisting of the write command, write address, and write data into the serial data synchronously with the clocks. The CPU 24 controls the multiplexer 88 on the basis of the bit output of the first bit. When the data bit is set to "1" at this time, the multiplexer 88 selects the frequency signal of 482 kHz. When the data bit is set to "0", the multiplexer 88 selects the frequency signal of OHz. As shown in FIG. 6A, since the first bit of the write command is set to "1", the multiplexer 88 first selects the frequency signal of 482 kHz.

Therefore, the first bit of the write information output from the CPU 24 is converted into the frequency signal and supplied to the induction coil 92 and induced in the induction coil 120 of the memory module 12. At this time, since the analog switch 122 is turned on by the inverted output of the inverter 136, the frequency signal of the first bit induced in the induction coil 120 is supplied to the band pass filter 124 and transmitted through the detection circuit 126. Then, the signal is waveform shaped to the square wave signal by the waveform shaping circuit 128. Thereafter, the first bit of the write command is supplied to the serial data input terminal DI of the shift register 112. At this time, the demodulated output of the shift clock based on the frequency signal of 450 kHz selected by the multiplexer 80 synchronously with the first bit of the write command is given to the shift clock terminal SK of the shift register 112. Therefore, the shift register 112 reads the first bit of the write command given to the serial data input terminal DI synchronously with the shift clock.

Subsequently, in discriminating block 208, a check is made to see if all of the bits of the write information have completely been transmitted or not. In this case, since the first bit has been transmitted, the processing routine is returned to block 210 and a bit counter n is counted up. Then, block 206 follows again and the second bit is transmitted.

After completion of the serial transmission of all bits from the write command to the write data of the write information, the processing routine advances from discriminating block 208 to block 212. In block 212, the write information converted into the parallel data is written into the non-volatile memory 114 by the shift register 112. Practically speaking, by inhibiting the selection of the frequency signal of 465 kHz to enable by the multiplexer 80, the enable clock obtained through the OR gate 110 is set to the L level and the chip selection terminal CS is turned off. In this manner, the write data stored in the shift register 112 is written into the memory 114.

On the other hand, to read out the data when making the drive management data by detaching the memory module 12 from a vehicle, the same circuits as the band pass filter 124, detection circuit 126, and waveform shaping circuit 128 in the memory module 12 are connected to the induction coil 92 in place of the sine wave oscillator 86, multiplexer 88, and amplifier 90 in the write unit 10 in FIG. 5, and the reproduced serial bit data is input to the CPU 24. It is sufficient to use a recording data readout unit with the above constitution.

Figure 9:
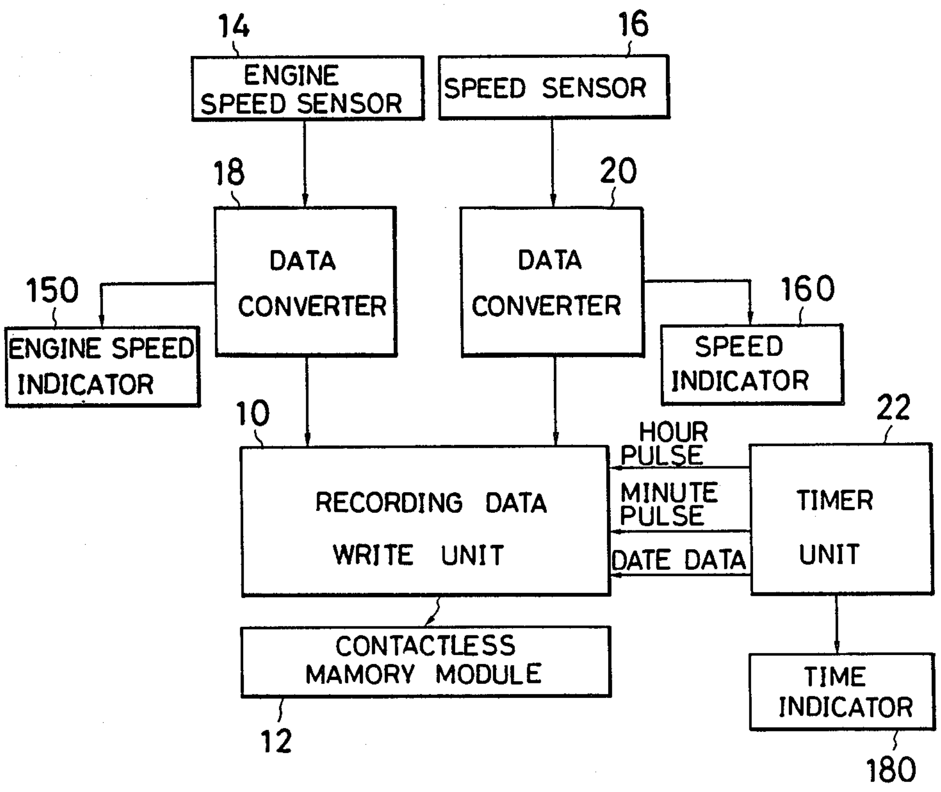
FIG. 9 is a block diagram showing another embodiment of the invention.

FIG. 9 is a block diagram showing another embodiment of the invention. A feature of this embodiment is that an engine rotational speed indicator 150, a vehicle speed indicator 160, and a time indicator 180 are added to the embodiment of FIG. 1.

Namely, the detection signal obtained from the engine speed sensor 14 through the data converter 18 is supplied to the engine speed indicator (tachometer) 150 to display the engine rotational speed. On the other hand, the vehicle speed signal derived from the vehicle speed sensor 16 through the data converter 20 is supplied to the speed indicator (speed meter) 160 to display the vehicle speed. Further, the time signal obtained from the timer unit 22 is input to the time indicator 180 to display the time.

Each of the indicators 150, 160, and 180 can indicate the data by an analog value or digital value.

According to the embodiment of FIG. 9, a display unit of an instrument panel of a vehicle can be integrally constructed together with the vehicle information recording apparatus of the invention.

Figure 10:
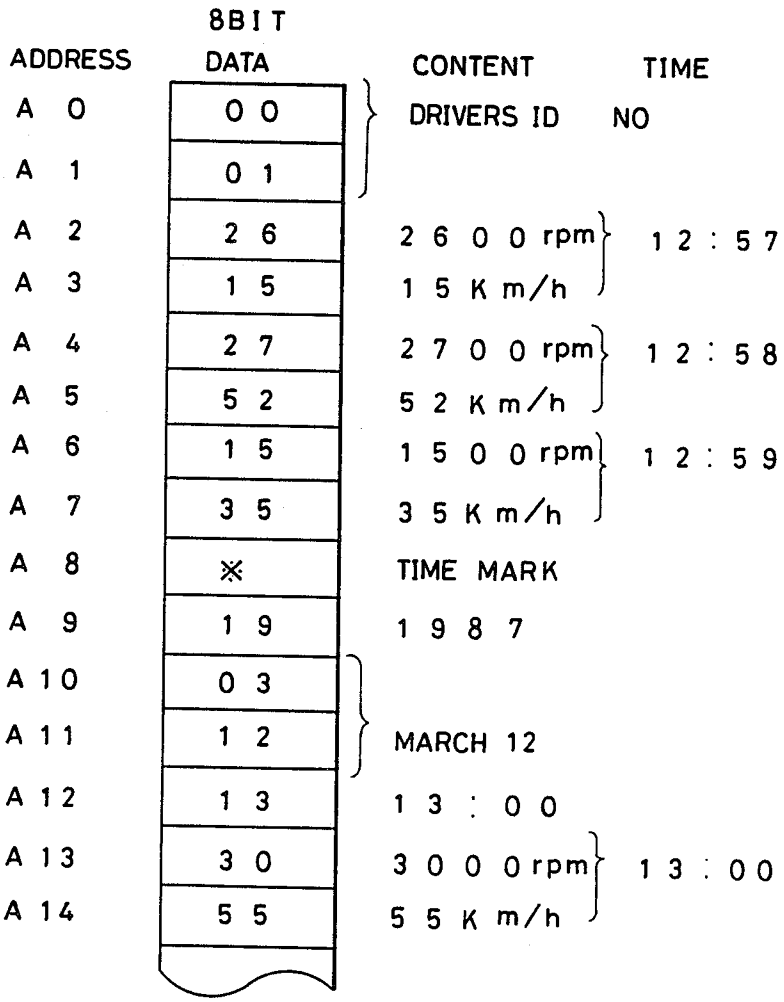
FIG. 10 is an explanatory diagram showing another example of recording data which is recorded into the memory module.

FIG. 10 is an explanatory diagram showing another example of vehicle data which is recorded in the memory module 12 in the embodiments of FIGS. 1 and 9. In the case of the vehicle data in FIG. 10, when the engine is started, the ID number of a driver is written as shown in addresses $A_0$ and $A_1$, thereby enabling the making efficiency of the drive management data to be improved.

As further another example of recording, it is also possible to constitute such that by writing the drive distance of a vehicle every hour or every start or stop of the engine, the data of the drive distances can be easily collected.

Further, it is also possible to constitute such that the amount of fuel consumed is detected and recorded together with the drive distance of a vehicle and can be calculated as the drive management data of the fuel consumption ratio of the vehicle.

Moreover, the vehicle information recording apparatus of the invention is not limited to only the recording of the drive data but can be also directly applied to the case of recording data of a proper apparatus to collect information from sensors or measuring instruments attached to a vehicle. For example, the invention can be applied to the recording of charge data of taxi, the recording of working data in construction vehicles (press fitting load and the like when piling), the data recording for self-diagnosis of vehicles, and the like.

What is claimed is:

1. A vehicle information recording apparatus comprising:

information collecting and processing means for collecting detection signals from one or a plurality of measuring instruments attached to a vehicle and for making vehicle data;

a detachable memory module having a non-volatile memory therein;

writing means for writing the data made by said information collecting and processing means into said memory module; and contactless coupling means for performing a transmission of write data and a power supply to the memory module from said writing means by a contactless coupling by use of induction coils.

2. An apparatus according to claim 1, wherein said information collecting and processing means has a first data converter to convert the detection signal of an engine rotational speed sensor into numerical data on a predetermined time unit basis;

a second data converter to convert the detection signal of a vehicle speed sensor into numerical data every predetermined period of time; and a timer unit to generate date data indicative of year, month, and day, an hour pulse, and a minute pulse.

3. An apparatus according to claim 2, wherein said information collecting and processing means further has:

an engine rotational speed indicator to indicate the engine rotational speed obtained from said first data converter;

a vehicle speed indicator to indicate the vehicle speed obtained from said second converter; and a time indicator to indicate the date consisting of year, month, and day and the time consisting of hour and minute which are obtained from said timer unit.

4. An apparatus according to claim 2, wherein said information collecting and processing means further has means for generating a preset ID code number of a driver.

5. An apparatus according to claim 1, wherein said contactless coupling means has a magnetic induction coupling apparatus consisting of a first induction coil arranged on the side of said write unit and a second induction coil which is positioned in said memory module so as to face the first induction coil with a predetermined gap, and said writing means has (a) write control means for performing a writing operation of the vehicle data made by the information collecting and processing means into the memory module, and (b) write transmitting means for converting the vehicle data from the write control means to the memory module into the serial data and thereafter, for multiplexing by an FSK modulation by using frequencies which are different in accordance with a data bit, and for transmitting the frequency multiplexed data to the memory module through the magnetic induction coupling apparatus by a start-stop communication method, and wherein said memory module has (i) data demodulating means for converting the frequency multiplexed signal received through the magnetic induction coupling apparatus by the start-stop communication method into the data bit corresponding to the frequency, (ii) memory writing means for interpreting the data obtained by the data demodulating means and for writing the vehicle data into said non-volatile memory, and (iii) rectifying means for rectifying the frequency multiplexed signal and supplying a power source to internal circuits.

6. An apparatus according to claim 1, wherein said contactless coupling means has (a) a first magnetic induction coupling apparatus consisting of a pair of induction coils which are arranged so as to face each other and transmit a power source and a sync signal to the memory module from said writing means, and (b) a second magnetic induction coupling apparatus consisting of a pair of induction coils which are arranged so as to face each other and transmit a write command, a write address, and write data to the memory module from the writing means, said writing means has (1) sync information transmitting means for multiplexing a sync clock signal, an enable clock signal, and a power source signal by an FSK modulation using different frequencies, and for transmitting the frequency multiplexed signal to the memory module through said first magnetic induction coupling apparatus, and (2) write information transmitting means for converting write information consisting of the vehicle data, write command, and write address from said information collecting and processing means into the serial data and thereafter, for multiplexing the serial data by the FSK modulation using frequencies which are different in accordance with a data bit, and for transmitting the frequency multiplexed signal to the memory module through said second magnetic induction coupling apparatus, wherein said memory module has (i) first demodulating means for reproducing an operating power source, a sync clock, and an enable signal based on said sync clock and enable clock from the frequency multiplexed signal obtained from the first magnetic induction coupling apparatus, (ii) second demodulating means for reproducing the write command, write address, and vehicle data from the frequency multiplexed signal obtained from the second magnetic induction coupling apparatus, and (iii) memory writing means which is made operative by receiving the sync clock and enable clock reproduced by said first demodulating means and writes the vehicle data obtained from said second demodulating means into said non-volatile memory.

* * * * *